United States Patent [19]

Asano

[11] 4,043,574
[45] Aug. 23, 1977

[54] PIPE FITTING HAVING NOTCHES THEREIN FOR RECEIVING A BEAD

[75] Inventor: Teryoshi Asano, Kawagoe, Japan

[73] Assignee: Sekisui Kagaku Kogyo Kabushiki Kaisha, Osaka, Japan

[21] Appl. No.: 642,042

[22] Filed: Dec. 18, 1975

[30] Foreign Application Priority Data

Dec. 18, 1975 Japan .......................... 49-154030[U]
Apr. 9, 1975 Japan .......................... 50-48374[U]

[51] Int. Cl.² ........................................... F16L 13/10
[52] U.S. Cl. ...................................... 285/21; 285/423; 285/DIG. 16
[58] Field of Search .................... 285/21, 423, 383, 22, 285/292, 287, DIG. 16; 156/158, 306

[56] References Cited

U.S. PATENT DOCUMENTS

| | | |
|---|---|---|
| 2,782,806 | 2/1957 | Stambaugh et al. ............. 285/423 X |
| 2,825,587 | 3/1958 | Barta et al. .................. 285/DIG. 16 |
| 2,998,269 | 8/1961 | Houghton ........................ 285/423 X |
| 3,768,841 | 10/1973 | Byrne ..................................... 285/21 |

*Primary Examiner*—Dave W. Arola
*Attorney, Agent, or Firm*—Sughrue, Rothwell, Mion, Zinn and Macpeak

[57] ABSTRACT

In a pipe fitting adapted for joining plastic pipes by fusing, one or more notches are provided in portions of the pipe fitting to receive molten resinous material overflowing during the fusing operation.

1 Claim, 1 Drawing Figure

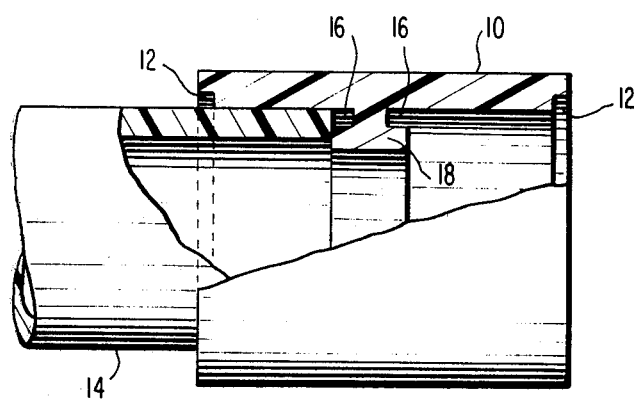

4,043,574

PIPE FITTING HAVING NOTCHES THEREIN FOR RECEIVING A BEAD

BACKGROUND OF THE INVENTION

The present invention relates to pipe joints or pipe fittings and in particular is a pipe fitting for joining one or more plastic pipes by a fusing operation.

Pipe joints or fittings adapted for joining plastic pipes, such as polyethylene pipes, are well known in the art and typically include, one or more socket portions for receiving the pipes to be joined, and an annular projection internal to the pipe fitting for serving as a stop for the joined pipes. Also, the internal diameter of the socket is typically slightly smaller than the external diameter of the resin pipes to be joined thereto for the purpose of insuring a tight fit. Pipes are joined to pipe fittings in the following conventional manner. The outer peripheral part of the pipe to be later inserted into the fitting socket and the inner peripheral part of the fitting socket are made molten by a conventional fusing operation. While molten, the pipe is inserted into the socket.

One of the problems associated with prior art pipe fittings of the latter type is related to the occurrence of a certain amount of molten resin overflowing during the fusing operation. Molten resin which overflows internally often collect near or on the annular projection thereby providing an additional projection in the path of the fluid for which the pipe is designed. As a result, the projection may interfere with the desired flow of the fluid through the joined pipes. Additionally, molten resin overflowing on the external portion of the joined arrangement often collects on the pipe just at the outside of the socket. The latter resin creates an unpleasant appearing surface which may also be the cause of the joined portion being broken. For example, the raised edge formed by the overflowed resin can have external forces applied thereto.

SUMMARY OF THE INVENTION

It is an object of the present invention to eliminate the above mentioned disadvantages and to provide a pipe fitting having socket portions for inserting and fusing pipes to be joined thereto and a projecting ridge formed along the peripheral direction on the inner surface of a socket, wherein a recessed groove is provided on the side surface of the projecting ridge.

It is a further object of the invention to provide a pipe fitting having a notched portion formed along the periphery of the inner wall of the socket at the end portion thereof.

BRIEF DESCRIPTION OF THE DRAWINGS

The only drawing is a partially cut away sectional side view of a pipe fitting in accordance with a preferred embodiment of the present invention having a pipe joined thereto.

DETAILED DESCRIPTION OF THE PREFERRED EMBODIMENT

As shown in the drawing, a hollow pipe fitting 10 formed of a resin material is provided for joining two pipes thereto. For purposes of clarity, only one plastic pipe 14 is illustrated as being joined to the pipe fitting 10. The pipe fitting is hollow and includes a projecting ridge 18 around the inner periphery of the fittings. The projecting ridge forms a stopper as the pipe 14 is inserted into the opening or socket of the pipe fitting. The diameter of the internal surface of the pipe fitting 10 is generally selected to be slightly smaller than the external diameter of the pipe 14 to be joined thereto. This insures a tight fit as the end of pipe 14 is squeezed into the socket of pipe fitting 10. As described above, during the fusing operation molten resin has a tendency to overflow at at least two places. One place is near the edge of the pipe fitting, the other place is near the edge of the pipe 14. Molten resin overflowing near the edge of the pipe fitting will form a ridge around the pipe 14. This ridge is not only unpleasant in appearance but can cause structural defects. The molten resin overflowing the edge of the pipe 14 solidifies and projects towards the center of the pipe and pipe fitting thereby becoming an impediment to the free flow of fluid through the pipe and pipe fitting connection. The problem caused by the flow of molten resin over of the edge of the pipe fitting is solved by forming a notch around the inner periphery of the pipe fitting at the edge thereof. It will be noted that an annular notch 12 is provided at both edges of the pipe fitting. In this case the molten resin will flow and collect in the annular notch 12. In order to solve the problem connected with the molten resin overflowing the edge of the pipe inserted into the pipe fitting, an annular notch 16 is provided on the side of projection 18 facing the opening in the pipe fitting. Since the pipe fitting illustrated has two openings for receiving two pipes, respectively, projecting ridge 18 is provided with annular notches 16 on both sides thereof. During fusing operation as molten resin overflows the edge of pipe 14, the latter molten resin will collect in the annular notch 16.

It will be apparent that a pipe fitting can be constructed in accordance with the present invention having only one of the annular notches. However, it is preferred to have both annular notches as shown in the drawing.

What is claimed is:

1. In a cylindrical resin material pipe fitting for thermal fusion to a resin material pipe insertably received within one end of said cylindrical pipe fitting, said pipe fitting having an annular projection on the internal surface of said pipe fitting axially inward of the open end of said pipe fitting and serving as a stop for the inserted pipe, the improvement comprising the external diameter of said pipe being slightly greater than the internal diameter of said pipe fitting, and a first annular notch within the side wall of said projection facing said inserted pipe and a second annular notch within the edge of said cylindrical pipe fitting receiving said inserted pipe on the inner periphery thereof; whereby, during fusing operation some molten resin forced towards said annular projection due to the force fit of the pipe within the pipe fitting is received within said first annular notch to facilitate fusion of said cylindrical pipe fitting to said inserted pipe and is prevented from projecting radially inwardly beyond the edge of the inserted pipe and from becoming an impedent to the free flow of fluid through the pipe and pipe fitting, while other molten resin which escapes between said forced fit pipe and said pipe fitting adjacent the edge of said cylindrical pipe fitting receiving said inserted pipe, is received within said second annular notch to eliminate the formation of a ridge around the inserted pipe at the edge of the pipe fitting.

* * * * *